United States Patent [19]

Suchy et al.

[11] Patent Number: 5,402,457
[45] Date of Patent: Mar. 28, 1995

[54] FUEL ASSEMBLY WITH A GRID STRUCTURE BETWEEN THE RODS

[75] Inventors: Peter Suchy, Erlangen; Günter Bruch, Nohfelden; Alexander Steinke, Ebermannstadt; Franz-Josef Bökers, Fürth, all of Germany

[73] Assignee: Siemens Aktiengesellschaft, Munich, Germany

[21] Appl. No.: 161,880

[22] Filed: Dec. 3, 1993

[30] Foreign Application Priority Data

Jun. 3, 1991 [DE] Germany ............... 41 18 124.7

[51] Int. Cl.$^6$ ................................. G21C 3/34
[52] U.S. Cl. .................................. 376/443; 376/439
[58] Field of Search ............... 376/462, 438, 439, 443

[56] References Cited

U.S. PATENT DOCUMENTS

| | | | |
|---|---|---|---|
| 3,928,131 | 12/1975 | Wachter et al. | 176/78 |
| 4,827,063 | 5/1989 | Bökers et al. | 376/439 |
| 4,970,048 | 11/1990 | Noailly | 376/439 |

FOREIGN PATENT DOCUMENTS

| | | |
|---|---|---|
| 349408 | 1/1990 | European Pat. Off. . |
| 364623 | 4/1990 | European Pat. Off. . |
| 261544 | 1/1991 | European Pat. Off. . |
| 2578348 | 9/1986 | France . |
| 1564697 | 1/1975 | Germany . |
| 2602487 | 9/1976 | Germany . |
| 884591 | 5/1979 | U.S.S.R. . |

*Primary Examiner*—Donald P. Walsh
*Assistant Examiner*—Frederick H. Voss
*Attorney, Agent, or Firm*—Herbert L. Lerner; Laurence A. Greenberg

[57] ABSTRACT

In a fuel assembly, rods are disposed in meshes of a grid. Crossing points of the grid are distributed in a checkerboard-like manner, partly in an upstream crossing plane and partly in a downstream crossing plane. Webs of the grid run in zigzag form between the two planes. As a result, flow resistance which is produced by the webs and/or by mixing vanes disposed thereon and by flow turbulences is shifted into different axial planes and is considerably reduced.

18 Claims, 8 Drawing Sheets

FUEL ASSEMBLY WITH A GRID STRUCTURE BETWEEN THE RODS

CROSS-REFERENCE TO RELATED APPLICATION

This application is a Continuation of International application Ser. No. PCT/DE92/00433, filed May 27, 1992.

BACKGROUND OF THE INVENTION

Field of the Invention

The invention relates to a grid structure for an elongate fuel assembly with rods disposed parallel and next to one another, between which a stream of coolant is conducted through the fuel assembly. The invention also relates to such a fuel assembly with a spacer and/or a mixing grid with such a grid structure.

Published European Application No. 0 364 623 which discloses such a fuel assembly for a pressurized water reactor and German Published, Non-Prosecuted Application DE 15 64 697 A1 which uses spacers with mixing vanes, are described below in the description of the drawings.

It has also already been proposed to place such grid structures with mixing vanes even in planes of the pressurized water reactor which in fact do not require any spacer for reasons of stability, in order to reinforce the lateral mixing-through of the coolant and to permit a radial temperature compensation. In such a device, the webs, in the case of spacers have holding assemblies (for example in the form of dimples and springs) for fixing the lateral position of the fuel rods, if anything also include safety stops, in order to prevent the rods from striking against the mixing vanes and damaging them in the event of vibration.

Such mixing vanes have also already been proposed in the case of boiling water reactors, although mixing-through over a number of fuel assemblies is not possible therein due to the fuel channels and their walls. In that case, however, a swirl produced in flow subchannels leads to vortices in the axial flow, which especially in the upper part of the fuel assembly, where the coolant is in the form of a liquid/vapor mixture, leads to a wetting of the fuel rods by liquid droplets contained in the mixture. As a result, the occurrence of hot spots is reduced, which particularly at high power outputs could lead to a drying out of the liquid film flowing along the fuel rods and to a worsening of the heat transfer ("dry out").

In that case, it is often necessary for the same flow resistance for the through-flowing coolant to occur in each case at all of the fuel assemblies of a reactor core, since differences in the flow resistance also cause corresponding differences in the flow distribution and cooling effect at the individual fuel assemblies.

Thus, for example, if after an operating cycle some of the old fuel assemblies are replaced by fuel assemblies with corresponding fittings to improve the temperature distribution, the flow resistance with respect to the neighboring fuel assemblies is worsened specifically because of the grid structures being employed, and consequently the coolant throughput is reduced in the "improved" fuel assemblies. That often has the effect of compensating or overcompensating for the success which is to be achieved.

Such a troublesome pressure loss on one hand occurs at a constriction of the flow cross section and an adjoining widening to the original size, which are caused by the webs and their crossing points as well as the spacing assemblies and mixing vanes disposed thereon (compression and expansion). On the other hand, the vortices and turbulences produced by the mixing vanes also result in further pressure losses.

Therefore, it has already been proposed to compensate for such pressure loss by reducing the fuel rod diameter, for example from 9.5 mm to 9.14 mm. In the case of fuel rod production that means that machines, tools and storage spaces have to be additionally set up for the new type of fuel rod. However, due to the reduction of the fuel rod diameter, the fuel content and the possible burn-up in the fuel assemblies is also reduced.

It may, however, also be an object from the outset to distribute the envisaged fuel content over fuel rods which are as thin as possible, with a correspondingly greater number of them having to be chosen. In that case, however, the flow resistance increases with the number of fuel rods and requires a fluidically favorable construction of the fuel assembly internals.

In U.S. Pat. No. 3,928,131 a spacer with longitudinal webs and with transverse webs which cross the longitudinal webs approximately perpendicularly is described. The crossing points all lie in one plane and the longitudinal and transverse webs are all of the same width at the crossing points. The webs in that case have dimples for supporting the fuel rods approximately in the center between two crossing points and on a level which lies approximately in the center between the upper edge and lower edge of the crossing points. In order to increase the flexibility of that grid structure, the transverse webs and longitudinal webs are significantly narrowed in the vicinity of the dimples, producing zigzag-shaped edges, on which the period of the zigzag-shaped course or progression corresponds to the distance between the center axes of neighboring fuel rods, that is the width of a flow subchannel.

Published French Application No. 2 578 348 shows spacers on which upper edges of approximately perpendicularly crossing webs run partially in zigzag form with a period corresponding to the half-period of the zigzag always above a level which corresponds approximately to the center plane of the spacer and on which the crossing points also lie, and the corresponding lower edges always run below that level.

SUMMARY OF THE INVENTION

It is accordingly an object of the invention to provide a fuel assembly with a grid structure between the rods, which overcomes the hereinafore-mentioned disadvantages of the heretofore-known devices of this general type and which keeps flow resistance for the coolant flowing through a fuel assembly as small as possible.

In order to achieve this object, the invention begins with the grid structure of the corresponding mixing grids and/or spacers. The flow resistance is so great there in particular because the webs extend as straight strips in a single plane perpendicular to the fuel rods, which is to say that the compression and decompression in all of the flow subchannels in each case take place in the same plane. The mixing vanes of all of the flow subchannels also lie in one plane, so that the pressure loss caused by the swirl also occurs in a single plane.

Therefore, in order to achieve the object, the invention provides for the crossing points at which the longitudinal webs cross the transverse webs, or the mixing vanes, which are disposed in the flow subchannels, to be distributed over at least two crossing planes.

With the objects of the invention in view, this produces the grid structure described above for an elongate fuel assembly of the type described initially above, in which the fuel rods are guided by the meshes of a grid and the grid is formed by webs which extend in zigzag form between an upper crossing plane (preferably an upper crossing plane perpendicular to the rods) and a lower crossing plane (preferably a lower crossing plane perpendicular to the rods), wherein the lateral surfaces thereof run between the rods and pass through one another at crossing points lying between the fuel rods, with a first group of crossing points lying in the upper crossing plane and a second group of crossing points lying in the lower crossing plane. This grid structure is already advantageous whenever dedicated mixing vanes are not considered necessary, for example in the case of each spacer which includes spacing means (for example springs and dimples) in order to fix the position of the rods laterally. For example, at the lower margin of the reactive zone, that is in the vicinity of the fuel assembly bottom end pieces, no mixing-through is necessary but instead only a fixing of the fuel rods. Thus, there a grid structure with spacing means but without mixing vanes is advantageous.

With the objects of the invention in view, there is additionally provided a grid structure for the mixing vanes which, in the case of a mixing grid of a fuel assembly, lie at the corresponding crossing points of the grid. In the case of this grid structure, the fuel rods are thus likewise guided by meshes of a grid, with mixing vanes being disposed at the crossing points of the grid that lie between the fuel rods.

In this case, in accordance with another feature of the invention, a crossing point of a first group of crossing points in each case has at least one mixing vane disposed in an upper crossing plane perpendicular to the rods, while each crossing point of a second group of crossing points has at least one mixing vane in a lower crossing plane perpendicular to the rods.

In the case of these embodiments, the grid is preferably formed by webs having lateral surfaces which are aligned parallel to the rods and run in zigzag form only between two planes being perpendicular to the rods and lying one behind the other in the direction of flow. However, webs which are inclined slightly with respect to the rods in the individual flow subchannels may also be used. The crossing planes, that are disposed one behind the other, may also be inclined with respect to the rods or be made up of individual, differently inclined partial planes.

It is not necessary with regard to the fundamental principle of a grid structure with low flow resistance for the webs of the grid to cross in the flow channels. Thus, for example, grid structures are known which include interconnected sleeves by which the rods of the fuel assembly are guided and are held by means of springs and dimples. If all of the sleeves lie with their welded joints and spacing means in a plane on these elements a flow resistance is also produced which can be reduced considerably if the elements are distributed over a plurality of planes lying one behind the other.

Therefore, with the foregoing and other objects in view there is provided, in accordance with the invention, a grid structure for an elongate fuel assembly with rods which are disposed next to one another and parallel to one another and form interspaces therebetween which form flow subchannels for a stream of coolant approximately parallel to the rods, the rods being guided by the meshes of a grid and the grid being formed by webs which have an end edge facing away from the stream of coolant, an end edge facing the stream of coolant and lateral surfaces approximately parallel to the stream of coolant. Each of the two end edges extends approximately in zigzag form between upstream extreme points and downstream extreme points, with at least some of the downstream extreme points of the end edge facing the stream of coolant lying approximately equally far or further downstream than at least some of the upstream extreme points of the end edge facing away from the stream of coolant. The half-period of the zigzag in this case corresponds to the distance between neighboring fuel rod axes, which is to say the width of a flow subchannel.

Other features which are considered as characteristic for the invention are set forth in the appended claims.

Although the invention is illustrated and described herein as embodied in a fuel assembly with a grid structure between the rods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
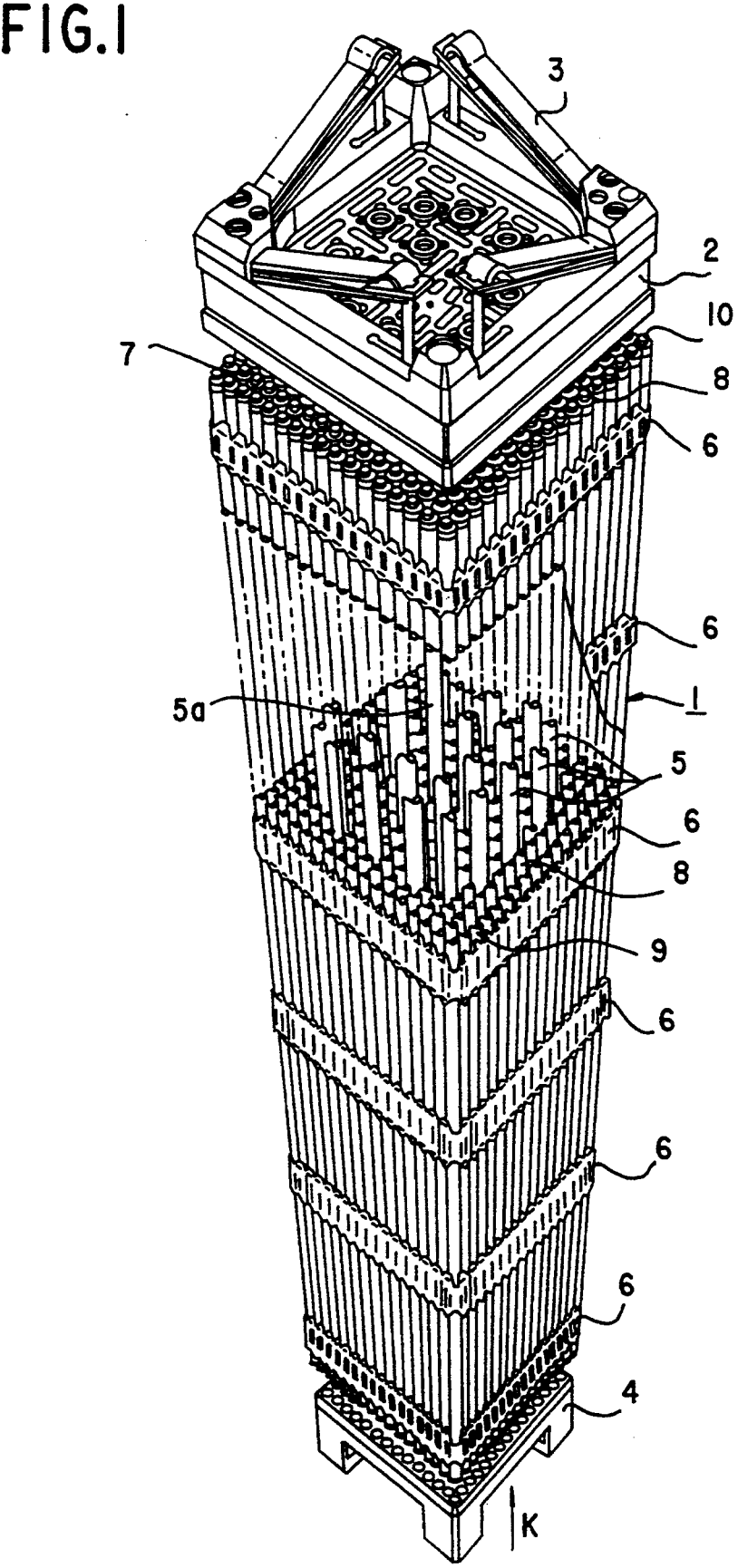
FIG. 1 is a diagrammatic, perspective view showing the construction of a pressurized water fuel assembly according to the prior art.

Referring now to the figures of the drawing in detail and first, particularly, to FIG. 1 thereof, there is seen a fuel assembly for a pressurized water reactor as is disclosed, for example, in Published European Application No. 0 364 623. The fuel assembly 1 contains, for example, 17×17 rods, a fuel assembly top end piece 2 with hold-down springs 3 and a fuel assembly bottom end piece 4. A number n (for example n=24) of the rods are guide rods or tubes 5, while a rod 5a is an instrumentation tube and remaining rods 7, 8, 9 and 10 are filled with fuel in the form of cylindrical pellets. Those rods are usually situated in a cross sectionally square grid configuration, while in the reactor core there is generally provided a predetermined number of fuel assemblies which are identical to one another. The fuel assemblies are disposed in a reactor pressure vessel and in each case a coolant K flows through them the direction of an arrow from bottom to top as shown.

In this case the rods are held in a supporting structure which includes the fuel assembly top end piece 2 with the hold-down springs 3, the fuel assembly bottom end piece 4, the guide tubes 5 lying in between, for non-illustrated control rods and, depending on the type of fuel assembly, the central instrumentation tube 5a. Disposed on the guide tubes 5 are grid-shaped spacers 6, which have a square cross section with square sheet-like meshes or openings. Each of the rods is guided by a mesh of the grid, so that the rods are combined to form a bundle or cluster and are held in such a way that they can freely expand axially, while their lateral position in the meshes is fixed by corresponding spacing means, for example springs and dimples on the webs of the spacer. The laterally open construction of the fuel assembly permits cross-mixing of the coolant K, which makes its heating-up more uniform.

In the case of a boiling water reactor, this cross-mixing is prevented by a channel which laterally surrounds the rods and extends from the bottom end piece to the top end piece. Control rods or other controllable absorber assemblies are disposed outside the channel, while the coolant K enters in liquid form through corresponding openings of the bottom end piece and flows as a liquid/vapor mixture through the passages in the top end piece 2. In this case one or more rods may be replaced by a water tube, through which liquid coolant flows and, under certain circumstances, may take up the cross section of a plurality of meshes of the spacer.

In order to achieve uniform temperature loading and high utilization of the fuel with optimum cooling, it is an aim to attain a temperature at the fuel rods which is as uniform as possible in the radial direction and in the axial direction. However, when operating the reactor, different parts of different fuel rods develop different temperatures, so that temperature peaks occur in the fuel assembly both in the axial direction and in the radial direction. Therefore, it has already been proposed in German Published, Non-Prosecuted Application DE 15 64 697 A1 to use spacers with mixing vanes, which are intended to produce a uniform radial temperature distribution in pressurized water reactors by inducing a cross-flow through the individual fuel assembly and over the interspaces of the fuel assemblies.

Figure 2:
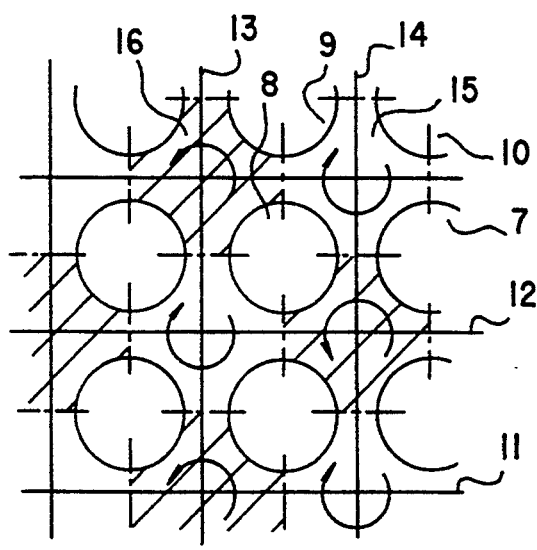
FIG. 2 is a cross-sectional view of a checkerboard-like division of crossing points or flow subchannels in a spacer without a mixing grid.

In FIG. 2, the grid structure of such a spacer is represented diagrammatically. In that case, the fuel rods 7 . . . 10 are each situated in a respective mesh of a grid. The meshes are formed by longitudinal webs 11, 12 and transverse webs 13, 14 which, in the case of a fuel assembly of square cross section, cross the longitudinal webs at a right angle. The fuel rods extend in a transverse or crossing plane perpendicular to the webs, while lateral surfaces thereof are aligned parallel to the rods.

That structure produces flow subchannels 15, 16, which are surrounded by four rods in each case. In FIG. 2, the flow subchannels are represented by being alternately hatched and unhatched, so that a checkerboard-like array of hatched channels, which are referred to below as "black" channels and unhatched channels, which are referred to below as "white" channels, is produced. In a white channel, which is surrounded by the rods 7, 8, 9, 10, for example, the longitudinal web 12 may have two non-illustrated lateral lugs on both sides of the crossing transverse transverse web 13, at an edge thereof facing away from the stream of coolant. The two non-illustrated lateral lugs are bent in opposite directions laterally into the stream of coolant in such a way that a swirl symbolically represented by an arrow is produced in the "white" channel 15. In the black channels, the transverse webs 13, 14 likewise have lateral lugs in each case being disposed on both sides of the crossing longitudinal web. The lateral lugs are constructed as mixing vanes and protrude oppositely relative to each other obliquely into the stream of coolant. However, an arrow indicated in FIG. 2 shows that there the alignment of the swirl being produced is opposite to the alignment of the swirl in the white channels.

This produces cross-flows, which in each case lead diagonally through the meshes of the grid and cross one another in the flow subchannels to form a rotational flow.

In FIG. 2 there is already shown a checkerboard-like pattern for the flow subchannels, in which the crossing points of the webs and the mixing vanes are located. According to the invention, not all of the crossing points lie in an axial cross sectional plane of the fuel assembly, but instead at least two such crossing planes and at least two groups of crossing points are provided, with the crossing points of the one group lying in the one crossing plane, and the crossing points of the other group lying in the other crossing plane. The checkerboard pattern of FIG. 2 in this case is produced when the one crossing point in each case belongs to the one group, and the other crossing point belongs to the other group, with the two crossing points lying next to each other in the grid. In FIG. 2, the flow subchannel 16 and the other flow subchannels with the crossing points belonging to the first group are emphasized by the hatching and in FIGS. 3 and 4 the longitudinal web 11 and the transverse web 13 are represented by solid lines, while the webs 12 and 14 lying behind are drawn with broken lines. The parts of these webs lying in these hatched channels are likewise identified in FIGS. 3 and 4 by hatching.

The longitudinal webs 11 and 12 run approximately in zigzag form and have slots 15 in their upper and lower regions through which the transverse webs 13 and 14, which likewise run in zigzag form and have insert slots 16 in their upper and lower regions, are inserted. As a result, virtually two groups of longitudinal webs and two groups of transverse webs are produced, with the longitudinal web 11 belonging to the one longitudinal web group and all of the other longitudinal webs of this one group being completely covered in FIG. 3 by the longitudinal web 11, while the other longitudinal web 12 belongs to the other group and covers all of the longitudinal webs of the other group. The two longitudinal webs which neighbor the longitudinal web of one group then in each case belong to the other group. In the same way, in FIG. 4 the transverse webs 13 and 14 belong to two transverse web groups and a transverse web of one group neighbors two transverse webs of the other group.

Figure 3:
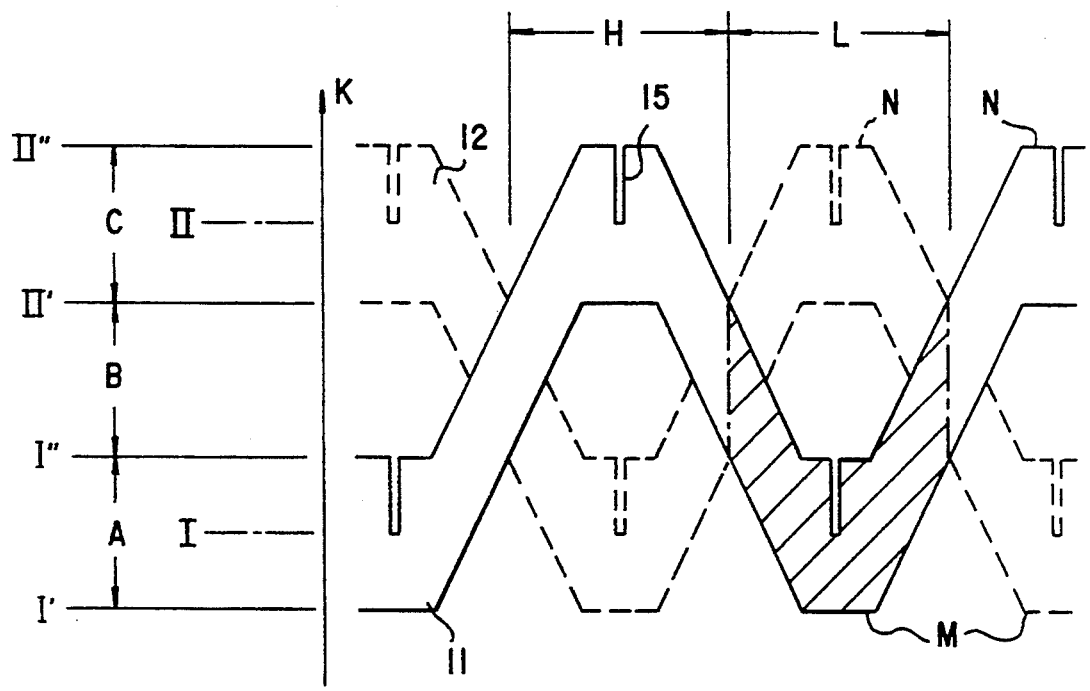
FIGS. 3 and 4 are respective fragmentary, enlarged, elevational views of two longitudinal webs and transverse webs lying one behind the other in a perpendicular direction with respect to fuel rods.
Figure 4:
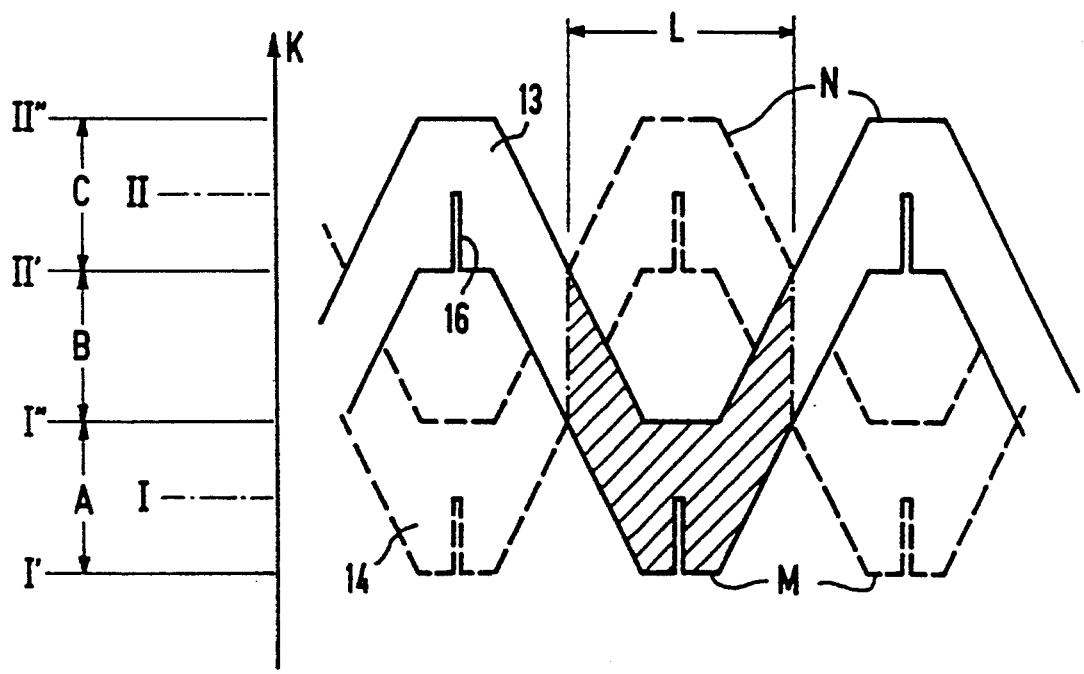

The longitudinal webs in this case pass through the transverse webs at lines of intersection determined by the slots 15, 16 within specified zones A and C which are perpendicular to the fuel rods. Corresponding cross sectional planes I and II which are perpendicular to the rods pass through the zones. The planes consequently describe the axial position of the crossing points. Thus, the longitudinal webs and transverse webs extend in zigzag form between these zones A and C or the corresponding crossing planes I and II as follows:

End edges M facing the stream of coolant K, that is to say the lower edges of the webs 11, 12, 13, 14 of FIGS. 3 and 4, run between extreme points situated in a plane I' that is upstream, and extreme points situated in a plane II' that is downstream. Similarly, end edges N of these webs facing away from the stream of coolant run between extreme points on the upstream plane I" and the downstream plane II". As FIGS. 3 and 4 show, in this case the downstream extreme points (plane II') of the end edge M facing the stream of coolant lie further downstream than the upstream extreme points (plane I") of the end edge N facing away from the stream of coolant.

The hatched or "black" flow channels lying in a lower crossing plane I then contain a group of crossing points, which are formed either by the longitudinal web 11 (or another longitudinal web of this group) and the transverse web 13 (or another transverse web of this group) or else by a longitudinal web and a transverse web of the other group (for example web 12 and web 14). The other crossing points lie in the upper crossing plane II and in each case are formed either by a transverse web of the one transverse web group and a longitudinal web of the other longitudinal web group (for example the webs 12 and 13) or a longitudinal web of the one longitudinal web group and a transverse web of the other transverse web group (for example the webs 11 and 14).

It can be seen that in the direction of the stream of coolant K, the flow cross section in the "black" flow subchannels is initially constricted increasingly in the zone A by the crossing webs and therefore in a flow subchannel which contains the lower crossing points and is identified by reference symbol L an increasing compression of the stream of coolant takes place in the zone A. In the "black" channels, the webs cross in this zone A. In the neighboring "white" flow subchannels, which contain only upper crossing points and are denoted by reference symbol H, the full flow cross section is still available in the zone A.

The zone A is adjoined by a zone B, in which the overall flow cross section of the two channels remains approximately the same, with the flow cross section of the white channels being constricted (or "contracted") approximately to the same extent as that by which the flow cross section in the black channels is enlarged (or "expanded") again.

In the plane II' there is a maximum contraction of the flow cross section for the white channels. In the zone C, the webs intersect in the white channels, while in the black channels there is an expansion or even the full, undisturbed flow cross section is again available.

In any event, the overall flow cross section increases in the zone C in spite of the intersection of the two grid webs.

Thus, in the direction of the stream of coolant K there is initially a contraction (and possibly already an expansion) only in some of the flow subchannels, while the other channels still do not exhibit any contraction or expansion. In the direction of the axial flow K, the same process then follows, with roles reversed: in those channels wherein the flow cross section was not constricted by crossing webs until now, there now occurs contraction or expansion, while in the other channels, in which contraction or expansion has already occurred, no further contraction or expansion now occurs.

This has the overall effect of producing a significantly smaller flow resistance, with a certain mixing of the flows in the subchannels also already taking place.

If the grid structure described with regard to FIGS. 3 and 4 is used as a spacer, springs and dimples or other non-illustrated spacing means are fastened on the webs, for holding the rods in the meshes of the grid. According to the same principle, the spacing means may also be distributed over a plurality of axial planes, in order to break up the cross sectional constriction as far as possible and not concentrate it on one plane. The cross sectional constriction is caused, for example, by springs and dimples.

Figure 5:
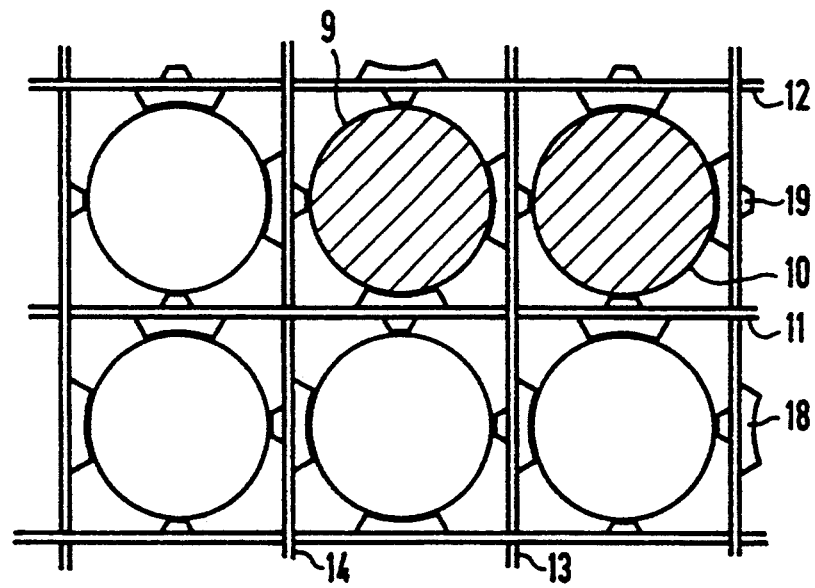
FIG. 5 is a fragmentary, plan view of the fuel assembly with fuel rods and a spacer, longitudinal webs and transverse webs.

FIG. 5 shows a plan view of a spacer that is constructed in this way from longitudinal webs and transverse webs, with springs 18 and dimples 19.

However, the grid structure of FIGS. 3 and 4 may also be used as a support for mixing vanes, in order to permit an axial and radial temperature compensation by corresponding swirling in the flow. Particularly suitable locations for these mixing vanes are zones B and D (planes I" and II"), since for instance in zone B, the contraction has already been completed there in each case in the one group of crossing points and the flow cross section is already expanding again ("black" flow channels), while in the neighboring ("white") flow channels virtually the full flow cross section is still available. Subsequently, turbulences and vortices may develop in the expanded stream of coolant, without leading to a high pressure loss.

Figure 6:
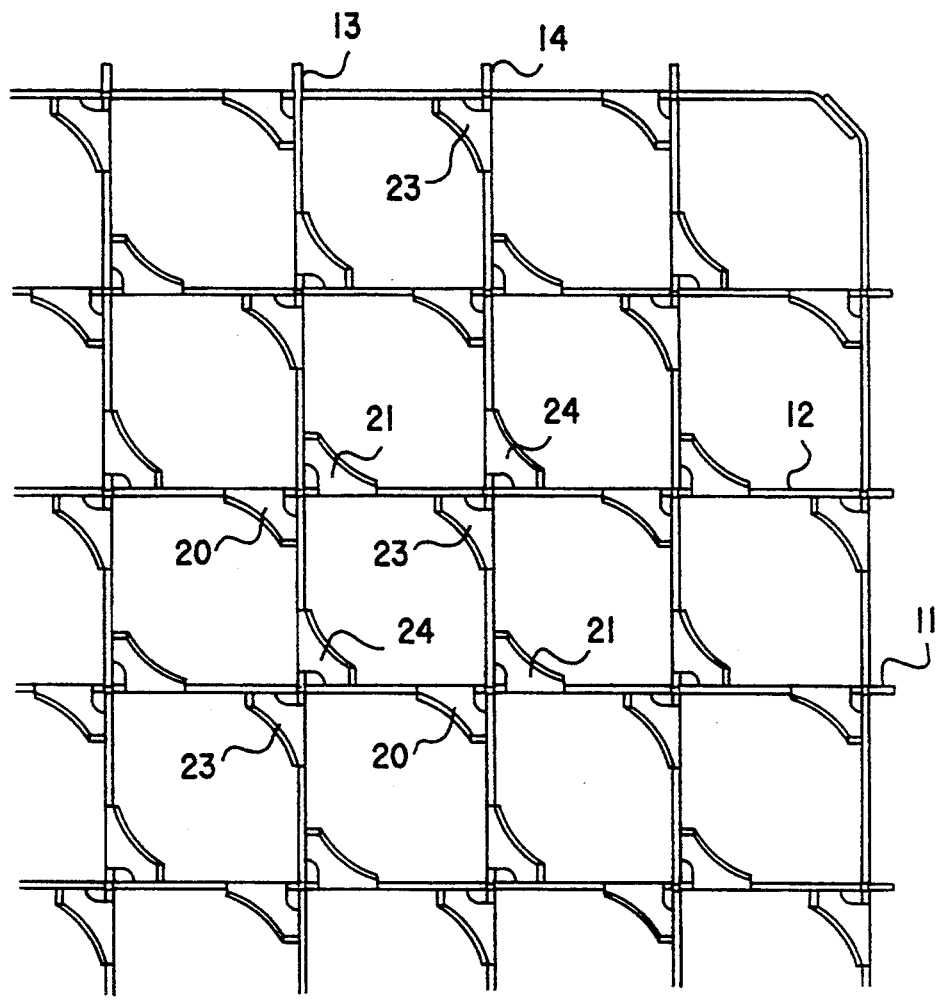
FIG. 6 is a corresponding fragmentary, plan view of a mixing grid with mixing vanes.

In FIG. 6, which is a plan view of the upper side of such a structure from above, facing away from the stream of coolant, it can be seen that at least some of the crossing points have at least one mixing vane inclined laterally with respect to the lateral surface of the webs. The mixing vanes are disposed on the edge of the webs facing away from the stream of coolant in each case. In the illustrated structure, in each case two neighboring crossing points have a pair of mixing vanes. For example, mixing vanes 20, 21 at a first of two crossing points, such as at the crossing of the webs 11 and 14 (or 12 and 13), are disposed on the edge of a first web 11, (or 12) while mixing vanes 23, 24 at a second of two crossing points are disposed on the edge of the web 13 (or 14) crossing the first web 11 (or 13). It is also possible to provide four such mixing vanes at each crossing point.

Figure 7:
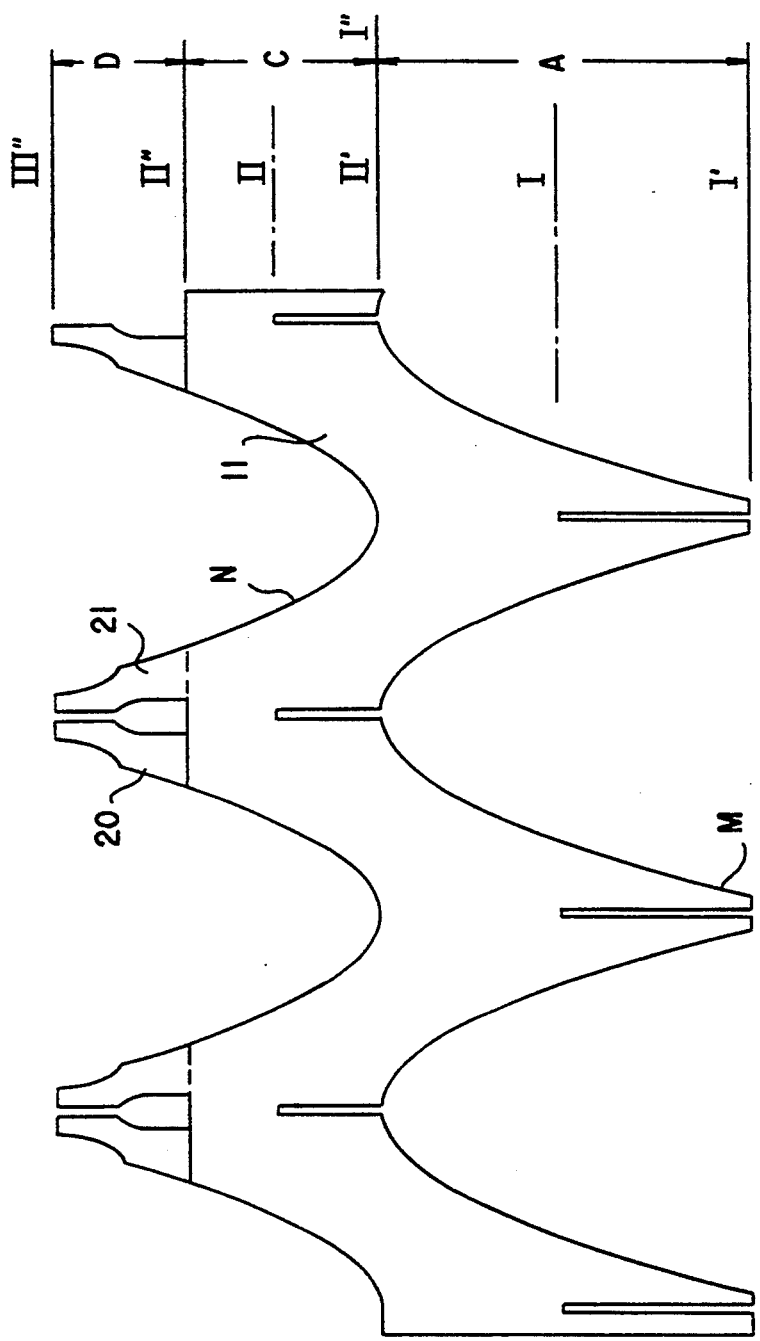
FIGS. 7 and 8 are enlarged, side-elevational views of a longitudinal web and a transverse web with mixing vanes according to the invention.
Figure 8:
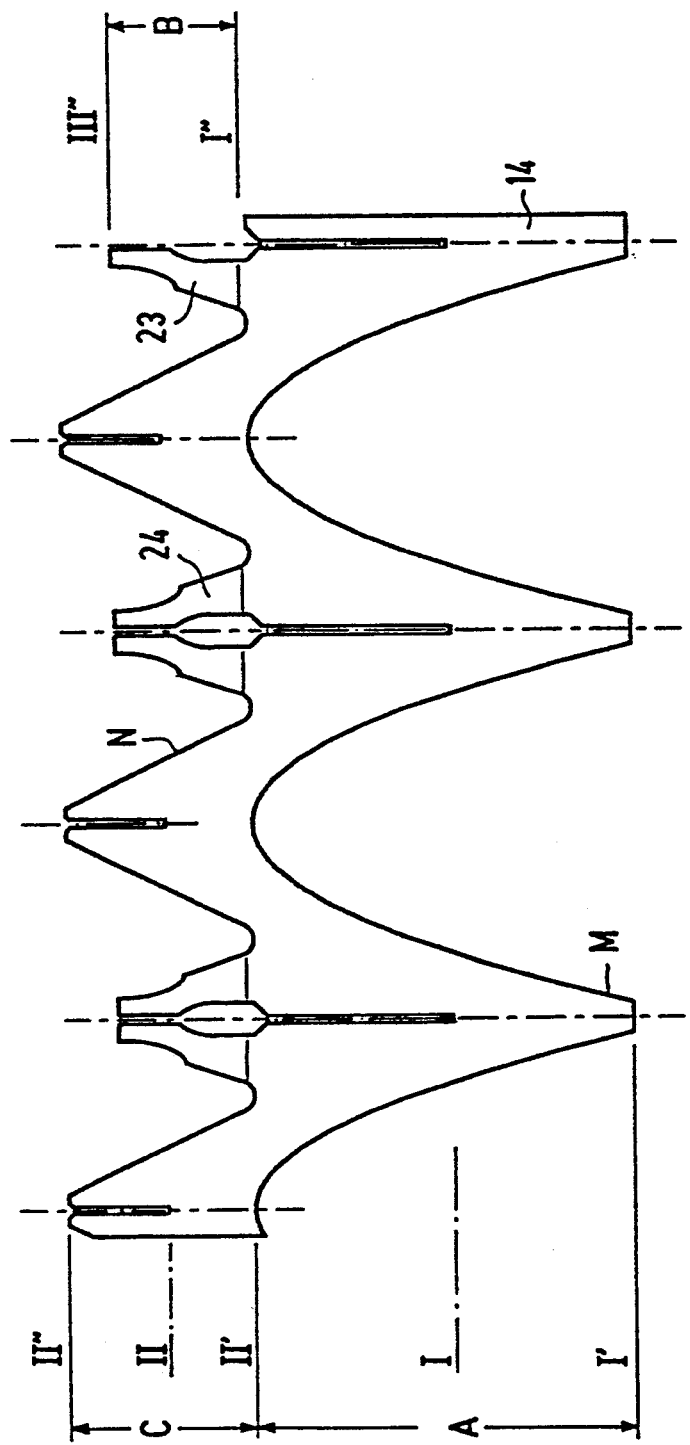
Figure 9:
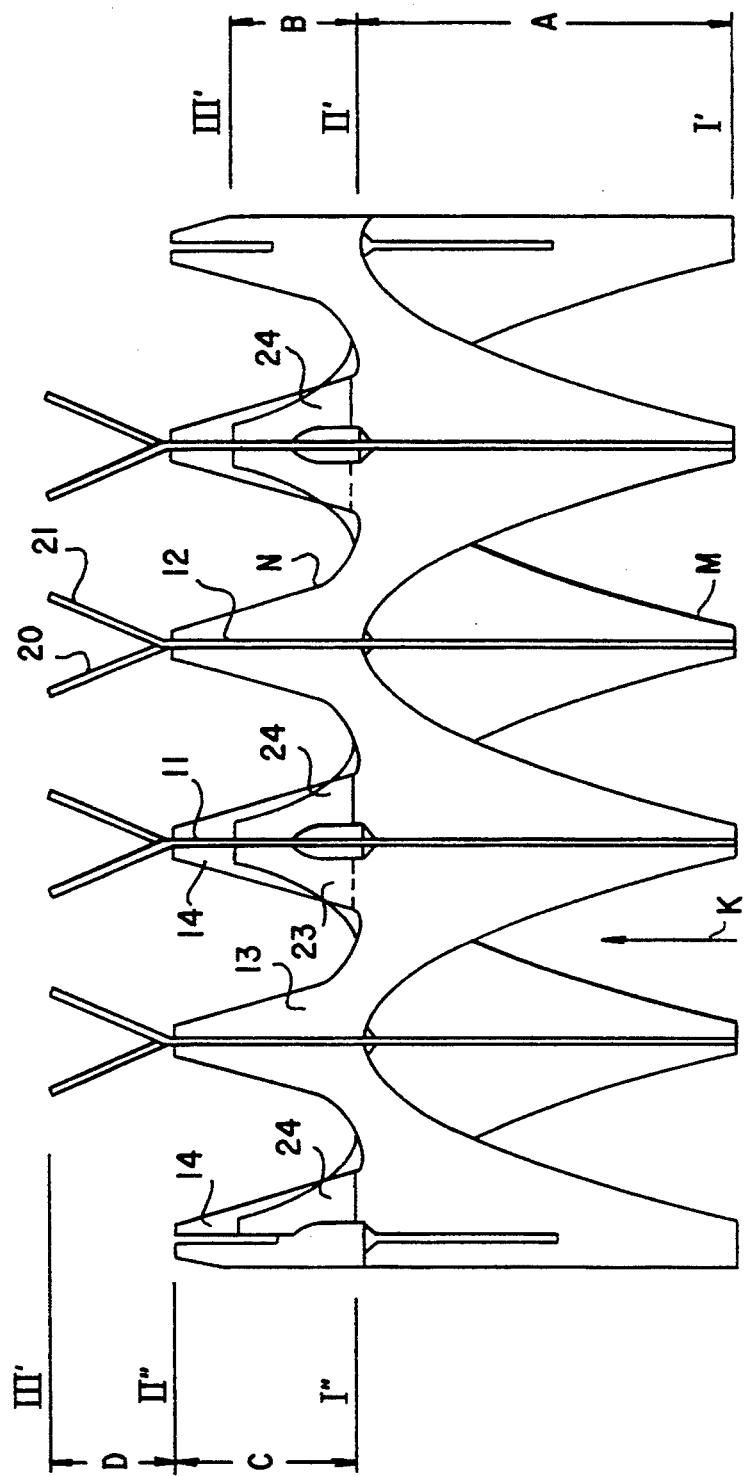
FIG. 9 is a side-elevational view of a grid structure according to the invention, serving as a mixing grid.

FIG. 7 is a side view of the longitudinal web 11 and FIG. 8 is a side view of the transverse web 14. FIG. 9 is a side view without fuel rods and FIG. 10 is a perspective side view with fuel rods, through part of the mixing grid constructed according to FIGS. 6 to 8.

In this case too, the (lower) end edge M of the webs facing the stream of coolant runs in zigzag form between the planes I' and II' on which its extreme points lie, while the extreme points of the (upper) end edge N facing away from the stream of coolant lie on the planes I" and II". In the case of this embodiment, the plane II' comes to lie virtually just as far downstream as the plane I". The lateral surfaces of the webs 11 to 14 extend between these end edges M and N and cross each other in the two zones A and C lying around the center planes I and II.

The longitudinal webs are parallel to each other, but they form two groups which are offset from each other by one mesh width in each case, as is shown by the longitudinal web 11 of the one group and the longitudinal web 12 of the second group. A corresponding structure then also applies for the transverse webs. It can now be seen that the longitudinal webs in each case have the mixing vanes 20, 21 which are disposed at the upper crossings, i.e. in the plane II'' while the mixing vanes 23, 24 disposed on the edge of the transverse webs 13 are disposed at the lower crossings, that is to say in the plane I''.

Figure 10:
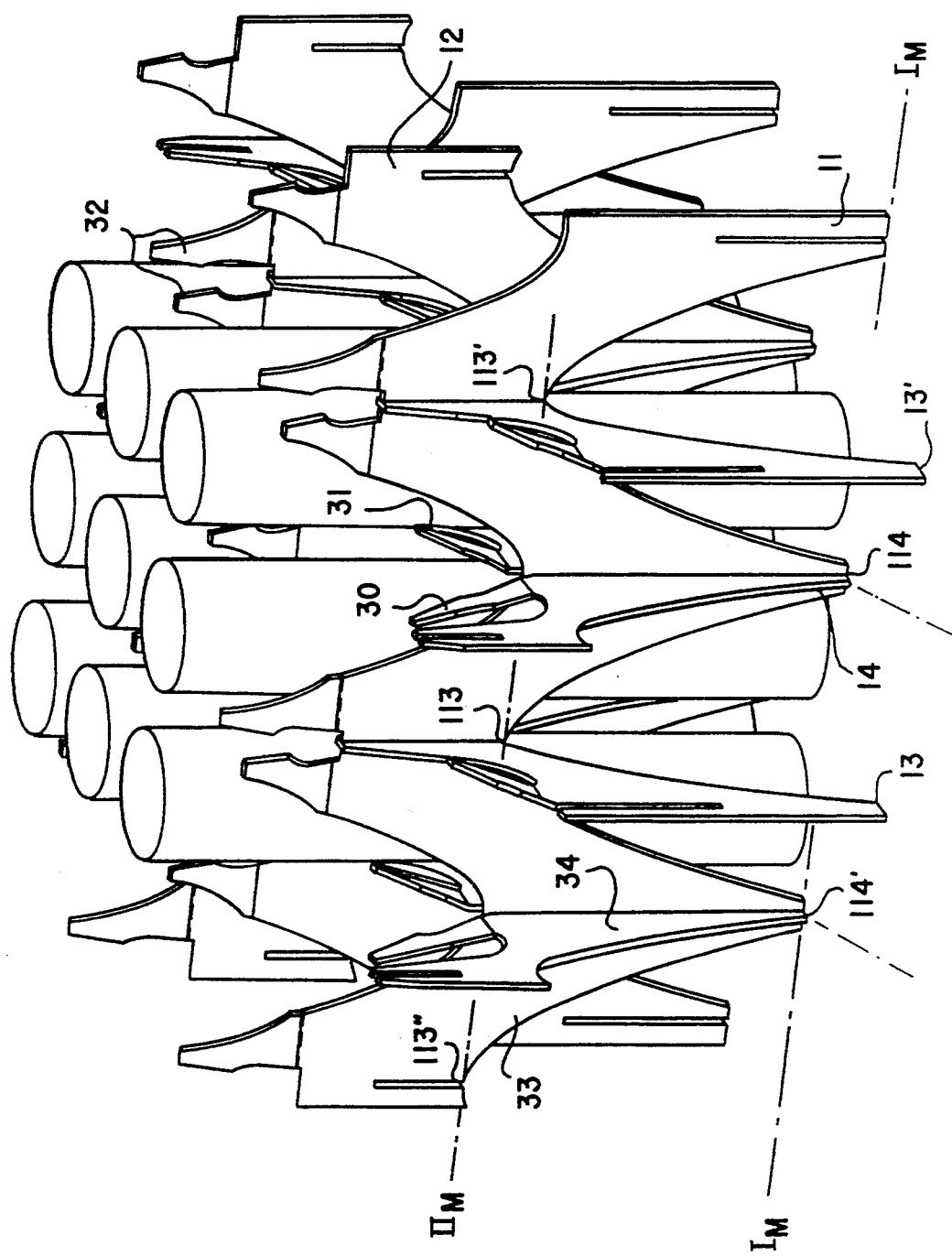
FIG. 10 is a side perspective view according to FIG. 9 after insertion of the fuel rods.

FIG. 10 shows a grid structure in a perspective representation together with rods situated in the meshes. In the case of pressurized water reactors, some of the rods are constructed as guide tubes for absorber assemblies or instrumentation tubes for guiding measuring lances or other instruments. Mixing vanes are preferably also provided on the webs supporting these rods, if the size of these guide tubes permits.

In FIG. 10 it has therefore been assumed that all of the flow channels which can be seen have mixing vanes 30, 31, 32. These mixing vanes are situated on edges of webs having lateral surfaces 33, 34 which are aligned virtually parallel to the rods and which run transversely to the rods in the interspace between the rods. In this case, the mixing vanes 30, 31 belong to one group of crossing points, which lie in the lower crossing plane, while the mixing vane 32 belongs to another group, lying in the upper crossing plane.

The number of mixing vanes depends on the flow conditions desired. Thus, under certain circumstances, a single mixing vane in each flow channel may suffice. However, it is advantageous if in each case a crossing point of a group having at least one mixing vane is respectively neighbored by a crossing point of the other group which likewise has at least one mixing vane.

Often at least two mixing vanes, that are inclined in opposite directions with respect to the lateral surface of the webs, are considered necessary for each crossing point between fuel rods. In the case of the grid structure according to the invention, these two mixing vanes preferably lie in the same crossing plane. Thus, the edge of a web which has a corresponding, inclined mixing vane then also has a second vane, inclined in the opposite direction.

In the case of the checkerboard pattern according to FIG. 2, a second crossing point which likewise has two mixing vanes comes to lie next to a first crossing point, in which a first web has the two mixing vanes. These mixing vanes of the neighboring, second crossing point are disposed on the edge of a second web facing away from the stream of coolant. The second web crosses the first web and is inclined in mutually opposite directions with respect to the lateral surfaces of the second web.

In FIGS. 6 to 10, spacing assemblies are not represented, but they are always provided if such a mixing grid with its mixing vanes is used at the same time as a spacer for the fuel rods.

It can be seen from FIG. 10 that—following the direction of a specific longitudinal web like web 11, i.e. following line $I_M$—this web crosses the transverse web 14 and web 14' ... of the first group of transverse webs at crossing points 114, 114' ... which lie in a lower plane, while the crossing points 113, 113', 113'' of longitudinal web 11 with transverse web 13 and the other webs 13', 13'' ... of the second group of transverse webs lie in an upper plane (line $II_M$). Therefore, the crossing points are divided into two groups, according to different planes, and crossing points of the one group alternate with crossing points of the other group. This is true for the direction of each longitudinal web like 11, 12 as well as in the direction of each transverse web like 13, 13', 13'', 14.

This checkerboard-pattern applies for the mixing vanes, too: Vanes 32 (some of which are clearly visible in FIG. 10) lie in an upper plane and alternate with vanes 30, 31 (mostly invisible while covered by other elements in FIG. 10) lying in a lower plane.

We claim:

1. A grid structure for an elongate fuel assembly, comprising:

a) a grid having lateral surfaces defining meshes for guiding rods being parallel and next to one another, the rods defining interspaces therebetween forming flow channels for a stream of coolant flowing approximately parallel to the rods, the flow channels having center axes being spaced apart by a given distance between the center axes of neighboring flow channels, said lateral surfaces extending between the rods and having an end edge facing toward the stream of coolant and an end edge facing away from the stream of coolant;

b) said end edges having upstream and downstream extreme points and a zigzag-shaped course between said extreme points with a half-period corresponding approximately to the given distance; and c) at least some of said downstream extreme points of said end edges facing toward the stream of coolant lying at least as far downstream as at least some of said upstream extreme points of said end edges facing away from the stream of coolant.

2. The grid structure according to claim 1, wherein said extreme points of said end edges facing toward the stream of coolant lying at least as far downstream are laterally offset approximately by the given distance relative to said upstream extreme points of said end edges facing away from the stream of coolant.

3. A grid structure for an elongate fuel assembly, comprising:

a) a grid having webs defining meshes for guiding rods disposed parallel and next to one another for conducting a stream of coolant therebetween longitudinally through the fuel assembly;

b) said webs extending in zigzag form between an upper crossing plane and a lower crossing plane, said webs having lateral surfaces extending between the rods and passing through one another at crossing points lying between the rods;

c) the crossing points including a first group of crossing points lying in the upper crossing plane, a second group of crossing points lying in the lower crossing plane, and each two crossing points lying next to each other in said grid including one crossing point belonging to one of the groups and another crossing point belonging to the other of the groups.

4. The grid structure according to claim 3, wherein said webs have edges facing away from the stream of coolant, and at least some of the crossing points each have at least one mixing vane being inclined relative to said lateral surface of said webs on said edge facing away from the stream of coolant.

5. The grid structure according to claim 4, wherein each two neighboring crossing points have at least one respective pair of said mixing vanes, said mixing vanes at a first one of the two crossing points is disposed on said edge of a given one of said webs and said mixing vanes at a second one of the two crossing points is disposed on said edge of another of said webs crossing said given web.

6. The grid structure according to claim 3, wherein said webs of said grid include at least two groups of longitudinal webs and two groups of transverse webs; a longitudinal web of the first longitudinal web group and a transverse web of the first transverse web group or a longitudinal web of the second longitudinal web group and a transverse web of the second transverse web group crossing in the first group of crossing points; and a longitudinal web of the first longitudinal web group and a transverse web of the second transverse web group or a longitudinal web of the second longitudinal web group and a transverse web of the first transverse web group crossing in the second group of crossing points.

7. The grid structure according to claim 6, wherein said webs have edges facing away from the stream of coolant, said edges of said longitudinal webs facing away from the stream of coolant have mixing vanes disposed in the one crossing group, and said edges of said transverse webs facing away from the stream of coolant have mixing vanes disposed in the other crossing plane.

8. A grid structure for an elongate fuel assembly, comprising:
    a) a grid having crossing points defining meshes therebetween for guiding rods disposed parallel and next to one another for conducting a stream of coolant therebetween longitudinally through the fuel assembly;
    b) mixing vanes protruding laterally into the stream of coolant at the crossing points lying between the rods; and
    c) the crossing points including first and second groups of crossing points, the crossing points of the first group each having at least one of said mixing vanes in a downstream crossing plane, and the crossing points of the second group each having at least one of said mixing vanes in an upstream crossing plane.

9. The grid structure according to claim 8, wherein each of the crossing points of one of the groups having at least one of said mixing vanes is adjacent a crossing point of another of the groups having at least one of said mixing vanes.

10. The grid structure according to claim 8, wherein the rods have longitudinal axes, and each of the crossing points has at least two of said mixing vanes lying in the same crossing plane and being in different directions relative to the longitudinal axes of the rods.

11. The grid structure according to claim 8, wherein said grid has webs with edges facing away from the stream of coolant, said edges have lateral surfaces, the rods have interspaces therebetween, said mixing vanes are disposed on said edges of said webs facing away from the stream of coolant, and said lateral surfaces of said edges are aligned approximately parallel to the stream of coolant and extend transversely to the stream of coolant in the interspaces between the rods.

12. The grid structure according to claim 10, wherein said grid has webs with edges facing away from the stream of coolant, said edges have lateral surfaces, the rods have interspaces therebetween, said mixing vanes are disposed on said edges of said webs facing away from the stream of coolant, said lateral surfaces of said edges are aligned approximately parallel to the stream of coolant and extend transversely to the stream of coolant in the interspaces between the rods, and said edge of said web having a first one of said at least two mixing vanes being inclined at one of the crossing points and having a second one of said at least two mixing vanes being inclined in an opposite direction at the one crossing point.

13. The grid structure according to claim 11, wherein said webs include a first web having at least one of said mixing vanes at a first crossing point, and a second web having at least one of said mixing vanes disposed on said edge facing away from the stream of coolant at a second crossing point being adjacent the first crossing point in the direction of said first web, and said second web crosses said first web and is inclined relative to said lateral surface of said second web.

14. The grid structure according to claim 11, wherein each of said webs extend in zigzag form between two of the crossing planes and cross one another at the crossing points.

15. The grid structure according to claim 1, wherein said grid has webs, and including spacing assemblies disposed at said webs for fixing lateral positions of the rods in the meshes of said grid.

16. The grid structure according to claim 11, including spacing assemblies disposed at said webs for fixing lateral positions of the rods in the meshes of said grid.

17. The grid structure according to claim 1, wherein said grid is part of a spacer, and including spacing assemblies for fixing lateral positions of the rods in the meshes of said grid.

18. The grid structure according to claim 8, wherein said grid is a mixing grid.

* * * * *